(12) United States Patent
Peters

(10) Patent No.: US 10,210,530 B1
(45) Date of Patent: Feb. 19, 2019

(54) SELECTING A REPORT

(75) Inventor: Bradley S. Peters, San Francisco, CA (US)

(73) Assignee: Infor (US), Inc., New York, NY (US)

( * ) Notice: Subject to any disclaimer, the term of this patent is extended or adjusted under 35 U.S.C. 154(b) by 877 days.

(21) Appl. No.: 11/515,232

(22) Filed: Aug. 31, 2006

Related U.S. Application Data

(60) Provisional application No. 60/837,419, filed on Aug. 11, 2006.

(51) Int. Cl.
*G06Q 30/02* (2012.01)

(52) U.S. Cl.
CPC .................................. *G06Q 30/02* (2013.01)

(58) Field of Classification Search
CPC ....................................................... G06Q 30/02
USPC ........................................................ 705/7.29
See application file for complete search history.

(56) References Cited

U.S. PATENT DOCUMENTS

| | | | |
|---|---|---|---|
| 5,954,510 A | 9/1999 | Merrill et al. | |
| 6,067,525 A | 5/2000 | Johnson | |
| 6,594,668 B1 | 7/2003 | Hudy | |
| 7,028,006 B1 | 4/2006 | Marsden et al. | |
| 7,483,842 B1* | 1/2009 | Fung .............. | G06Q 10/063112 705/7.14 |
| 2001/0037363 A1 | 11/2001 | Battilega et al. | |
| 2001/0056367 A1 | 12/2001 | Herbert et al. | |
| 2002/0019765 A1* | 2/2002 | Mann et al. ..................... | 705/11 |
| 2002/0069101 A1 | 6/2002 | Vincent | |
| 2002/0077998 A1 | 6/2002 | Andrews et al. | |
| 2002/0099678 A1 | 7/2002 | Albright et al. | |
| 2002/0116244 A1* | 8/2002 | Honarvar ............... | G06Q 10/06 705/7.31 |
| 2002/0116348 A1 | 8/2002 | Phillips et al. | |
| 2002/0123930 A1 | 9/2002 | Boyd et al. | |
| 2002/0161595 A1* | 10/2002 | Cepeda ............................. | 705/1 |
| 2003/0009373 A1 | 1/2003 | Ensing et al. | |
| 2003/0018562 A1* | 1/2003 | Guler et al. .................... | 705/37 |
| 2003/0018618 A1 | 1/2003 | Bestgen | |
| 2003/0061096 A1 | 3/2003 | Gallivan et al. | |
| 2003/0115094 A1* | 6/2003 | Ammerman et al. .......... | 705/11 |
| 2003/0177050 A1 | 9/2003 | Crampton | |
| 2003/0181792 A1* | 9/2003 | Seyko ........................... | 600/300 |
| 2003/0220773 A1 | 11/2003 | Haas et al. | |
| 2003/0220830 A1 | 11/2003 | Myr | |
| 2004/0117150 A1 | 6/2004 | Cuddihy et al. | |
| 2004/0138944 A1* | 7/2004 | Whitacre et al. ............... | 705/11 |
| 2004/0186765 A1 | 9/2004 | Kataoka | |
| 2004/0210475 A1* | 10/2004 | Starnes ................ | G06Q 10/105 705/320 |
| 2004/0210820 A1* | 10/2004 | Tarr et al. ...................... | 715/500 |
| 2005/0033706 A1 | 2/2005 | Krikler et al. | |
| 2005/0096963 A1 | 5/2005 | Myr et al. | |

(Continued)

FOREIGN PATENT DOCUMENTS

WO   WO9942974   8/1999

*Primary Examiner* — Kurtis Gills
(74) *Attorney, Agent, or Firm* — Blank Rome LLP

(57) ABSTRACT

Selecting a report from among a plurality of candidate reports is disclosed. A set of metrics and attributes associated with the plurality of candidate reports is received. Each of the candidate reports is evaluated with respect to a plurality of populations and with respect to the received set of metrics and attributes. A candidate report to be outputted is automatically selected based at least in part on the evaluation.

16 Claims, 15 Drawing Sheets

(56) References Cited

U.S. PATENT DOCUMENTS

| | | |
|---|---|---|
| 2005/0144108 A1 | 6/2005 | Loeper |
| 2005/0283393 A1 | 12/2005 | White et al. |
| 2006/0020509 A1* | 1/2006 | Strain et al. .................. 705/14 |
| 2006/0085211 A1 | 4/2006 | Bennett et al. |
| 2006/0149602 A1* | 7/2006 | Zammit ........................... 705/3 |
| 2006/0247990 A1 | 11/2006 | Narayanan |
| 2006/0277212 A1* | 12/2006 | Error ............................ 707/102 |
| 2006/0287883 A1* | 12/2006 | Turgiss et al. .................... 705/2 |
| 2007/0174111 A1 | 7/2007 | Anderson et al. |
| 2007/0179975 A1* | 8/2007 | Teh et al. .................. 707/104.1 |
| 2007/0192143 A1* | 8/2007 | Krishnan ............... G06Q 10/10 705/3 |
| 2007/0192163 A1 | 8/2007 | Barr |
| 2007/0198459 A1* | 8/2007 | Boone et al. .................... 707/1 |
| 2007/0239508 A1* | 10/2007 | Fazal et al. ...................... 705/8 |
| 2008/0097886 A1 | 4/2008 | Trott et al. |
| 2008/0162487 A1 | 7/2008 | Richter |
| 2008/0249824 A1 | 10/2008 | Dibernardino et al. |
| 2009/0276296 A1 | 11/2009 | Spriegel |
| 2009/0319344 A1 | 12/2009 | Tepper et al. |
| 2010/0100427 A1 | 4/2010 | McKeown et al. |

* cited by examiner

Alert: Click Here To Identify Opportunities for Retirement Accounts  ⌐302

JOE SMITH

| Period: | | March 2006 | # Households: | | 219 |
|---|---|---|---|---|---|
| TTM Gross Production: | 306 | $612,382 | # Accounts: | | 472 |
| TTM Account Production: | | $607,257 | $ AUM: | ⌐316 | $192,248,282 |

Key Business Metrics

| | You | Peers | UGBDF | | You | Peers | UGBDF |
|---|---|---|---|---|---|---|---|
| BPS Turn Ratio | 31.6 | 36.4 | 59.5 | $ Inflows/HH | $34,533 | $13,077 | $23,911 |
| $ Production/HH | $2,773 | $2,645 | $3,214 | % New HH | | | |
| $ Assets/HH | $844,811 | $819,727 | $593,145 | % Lost HH | 2% | 4% | 4% |
| # Accounts/HH | 318  2.16 | 2.13 | 2.58 | %HH No $ Prod | 33% | 22% | 14% |
| # Accounts/New HH | 1.71 | 1.79 | 1.96 | %HH Accounting for 90% Assets | 25% | 33% | 38% |
| $ Assets/New HH | $217,864 | $401,551 | $342,979 | % HH with 90% Assets in 2 pstns | 42% | 41% | 28% |

Jump Station

Lookup a Household  ⌐320
Account Development Opportunities
Asset Development Opportunities
Household Diversification Opportunities
Household Retention Opportunities  308
Generate Household Lists

Practice Profile

Portfolio  ⌐304  Uniform — Individual
Business — Generalist — Specialist
HH Focus — Broad — Narrow
Growth — Develop — Acquire
Pricing — Commission — Fees
310

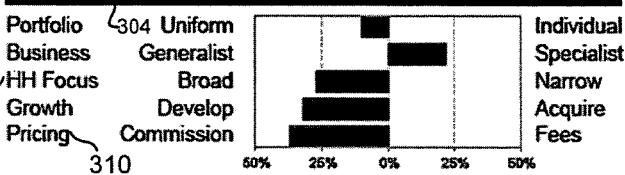

Quarterly Production Levels

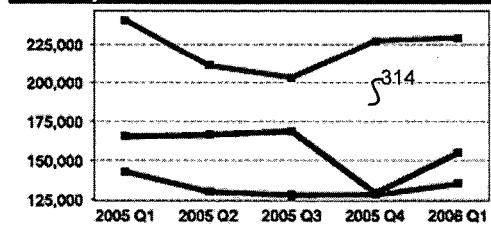

━━ You  ━━ All Peers  ━━ Top Peers

Focus Area Potential

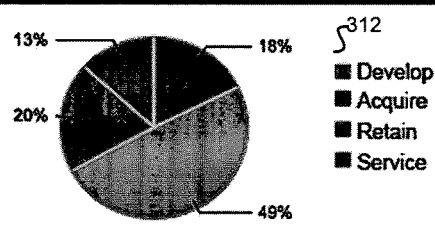

⌐312
■ Develop
■ Acquire
■ Retain
■ Service

Impact of Development Activities

Number of Households Developed  ⌐322

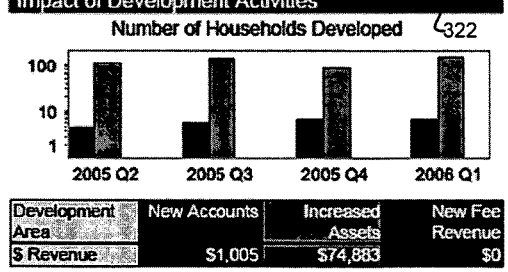

| Development Area | New Accounts | Increased Assets | New Fee Revenue |
|---|---|---|---|
| $ Revenue | $1,005 | $74,883 | $0 |

Performance Summary vs. Peers

324⌐ Production  AUM  Develop Service Acquire Retain

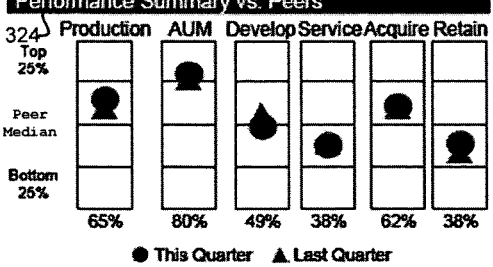

65%   80%   49%   38%   62%   38%
● This Quarter  ▲ Last Quarter

Focus Area Opportunities

| Area | Opportunity | Value | Target | Impact |
|---|---|---|---|---|
| ■ TTM Avg: $ Production/HH | Focus on increasing productivity of existing households and reducing non-productive ones | $2,773 | $3,102 | $61,149 |
| ■ T3M Pct HH with New Assets | Expand relationships with existing households by increasing share of wallet | 70% | 84% | $10,695 |
| ■ Pct. Assets in Top Position | Ensure clients are appropriately serviced and diversified | 36% | 31% | $10,442 |
| ■ Avg: # Asset Classes 90 Pct Assets | Ensure clients are appropriately serviced and diversified | 4.0 | 4.4 | $10,342 |
| ■ $ Assets | Focus on gathering additional assets from existing and new clients | $192,248,282 | $211,473,110 | $18,768 |
| ■ TTM # Lost HH | Reduce the number of lost relationships | 5 | 4.5 | $10,127 |

Top Metric Rankings

| Area | Percentile | Value | Peer Avg |
|---|---|---|---|
| ■ TTM Pct: New HH | 97% | 6% | 3% |
| ■ Pct. Assets in Top Asset Class | 95% | 24% | 41% |
| ■ T6M # Accounts Growth Rate | 87% | 8% | 4% |
| ■ T3M Pct HH with New Accounts | 87% | 3% | 2% |
| ■ Pct Est Assets Under Management/New HH | 86% | 381% | 452% |

SELECTING A REPORT

CROSS REFERENCE TO OTHER APPLICATIONS

This application claims priority to U.S. Provisional Patent Application No. 60/837,419 entitled DETERMINING IMPROVEMENT ACTIONS AND SELECTING REPORTS filed Aug. 11, 2006 which is incorporated herein by reference for all purposes.

BACKGROUND OF THE INVENTION

Typical business intelligence tools work by receiving and storing large quantities of business data (such as details of daily operations). While the tools are capable of outputting the information in pre-determined report formats and dimensional views (that show, e.g., the number of products sold in a quarter), a human analyst is required to sift through and interpret the significance of the information. Determining which information is of interest is a manual process—the analyst will look through what may be potentially hundreds of charts or other voluminous information to determine, for example, that discounting particular products results in more revenue than discounting other products.

One reason for this problem is that while existing business intelligence tools are capable of aggregating large amounts of information, interpreting the measured quantities (referred to herein as "metrics") in context remains a problem. For example, existing tools may be able to determine whether the total number of a product A sold this quarter is greater or less than the number sold last quarter and whether the average selling price of product B is higher this quarter or last quarter. However, it is difficult to discern whether the changes in those values are meaningful (such as from a revenue standpoint), whether efforts spent selling those products ought to have been focused elsewhere, and what the optimal value for those two metrics, taken together, ought to be, etc. It would be useful to provide more relevant comparisons.

In some cases, companies use dashboards or other visual tools to convey information selected by the analyst to employees. Suppose a firm has 2000 employees and an analyst determines that two charts are of particular interest—the number of a particular product sold last month, and the average selling price of that product. While the particular values shown to each employee may vary (e.g., showing Bob that he sold 100 units at an average of $97 and Jane that she sold 90 units at an average of $100), when the 2000 employees visit their respective dashboards, they will each be presented with those two specific charts, irrespective of whether those charts are meaningful or helpful to the individual employee. It would therefore be desirable to have improved methods of conveying information.

BRIEF DESCRIPTION OF THE DRAWINGS

Various embodiments of the invention are disclosed in the following detailed description and the accompanying drawings.

FIG. 3A illustrates an embodiment of an interface to a performance system.

FIG. 3B illustrates an embodiment of an interface to a performance system.

FIG. 4 illustrates an embodiment of an administrative interface to a performance system.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
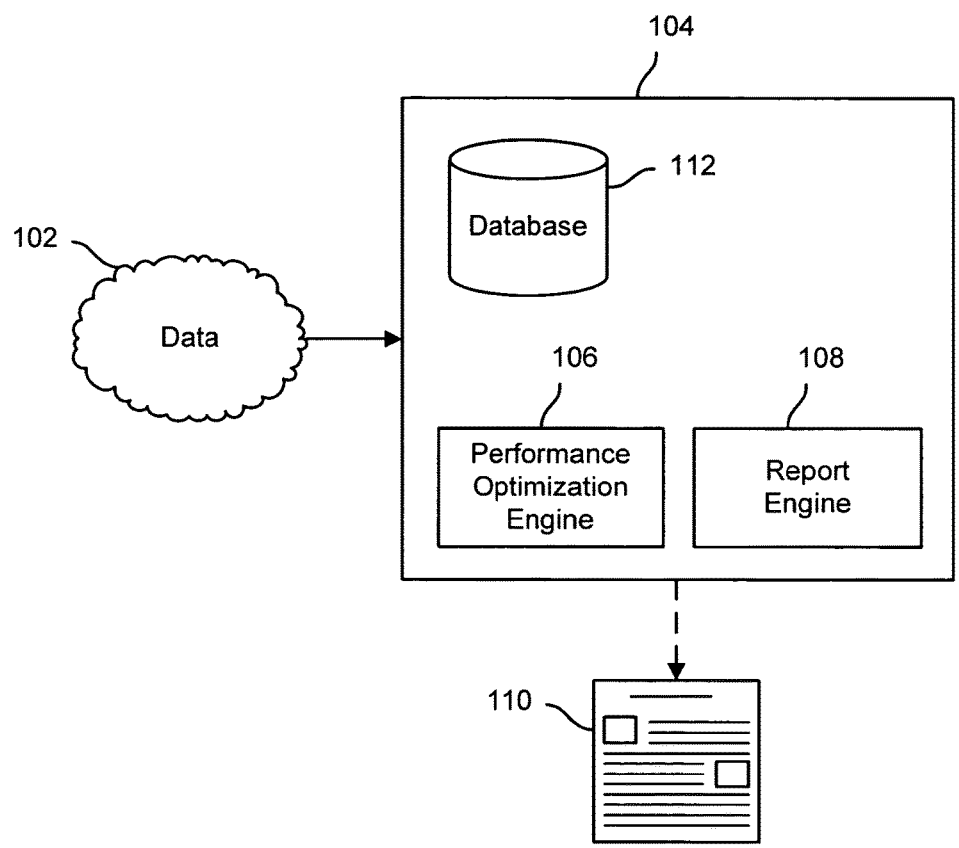
FIG. 1 illustrates an embodiment of an environment for evaluating and conveying performance information.

FIG. 1 illustrates an embodiment of an environment for evaluating and conveying performance information. Data 102 is input into performance system 104, such as by an administrator or third party consultant. Data 102 may or may not be in a multidimensional format (including lists of transactions, client statements for the last year, human resources/other biographical and demographical information, etc).

In the examples described herein, data 102 is business data generally related to the sale of products/services and the acquisition/retention of customers or any other systematic business process that lends itself to measurement. The desired result that the example businesses are trying to maximize is revenue and/or profit. However, the techniques described herein can readily be adapted to other scenarios (e.g., the management of call centers, field services, and factories) where multidimensional data analysis and performance analysis can be used to achieve strategic goals such as service cost or customer service.

Report engine 108 evaluates data, such as data 102 (and/or subsequent refinements/translations of that data such as may be stored in database 112) to identify the most relevant factors and patterns that govern the revenue obtained by an individual or groups of individuals. As described in more detail below, examples of considerations that may be included in report engine 108's determination are the impact of a particular metric on revenue (e.g., deal size), and attributes or ranges by which the metric can be partitioned (e.g., small, medium, large). Report engine 108 can use this information to select reports likely to be the most "interesting" to a particular individual or group of individuals, such as reports that detail specific actions a user can take to maximize revenue, including the attributes (or names of) of particular clients (or products or services) for which a new approach is needed. One way that a particular report can be determined to be interesting is by locating where a salesman has a gap in his performance (where he deviates from other salesmen most like him). If the metric associated with the gap has an impact on revenue and the gap is large, the report is likely to be interesting.

For example, it may be the case that the amount of ongoing attention a customer receives from a salesperson has significant impact on whether the customer will later be interested in upgrading their existing products when new products become available. Suppose that a salesman, Bob, generates a good amount of revenue in general, but has trouble convincing people to upgrade their products. Other salesmen working in Bob's territory are able to convince people to upgrade their products more often than Bob. A particularly interesting report to Bob would be one that identifies for Bob the specific reasons (not spending enough time on existing clients) that he is not as good at convincing people to upgrade their products and thus not maximizing his revenue. In particular, the information provided by report engine 108 to Bob may include the average number of phone calls made by him to clients in the last month plotted against the number of calls that salesmen working in his territory made.

Other examples of information that report engine 108 can provide include that specific existing clients (e.g., Janet Jones and Martha Thompson) ought to be offered estate planning services in addition to the retirement accounts they already have, and that a particular product should be offered for sale by Bob at a price of $1000 when selling to customers in the 95014 ZIP code, but $900 when selling to customers in the 95150 ZIP code.

It may also be the case that while certain successful salespeople happen to have a statistically significant number of married clients (or clients named Bill) relative to a less successful salesperson, the marital status (and first name of clients) have no or little bearing on revenue. The less successful salesperson thus ought not focus efforts on trying to recruit new customers having those particular attributes, but should instead focus on a more important area. By determining which reports are the most important to a user, the less important (and entirely unimportant) reports are accordingly filtered down, e.g., located toward the bottom of a display, not presented, or are otherwise given less prominence.

Performance optimization engine 106 evaluates data, such as data 102 (and/or subsequent refinements/translations of that data such as may be stored in database 112) to determine the marginal return to a particular individual or group of individuals of taking specific actions, as well as the individualized target values of assorted metrics. For example, performance optimization engine 106 can determine that a particular broker, John Smith, ought to spend approximately 20% of his time on developing leads into new clients, instead of the 25% he is currently spending.

As described in more detail below, performance optimization engine 106 makes these determinations by evaluating the impact of particular metrics on revenue and determining the optimal values for those metrics (also referred to herein as evaluating "candidate actions" and finding an "improvement action") based on a variety of factors such as the likelihood that a person can actually change the value of the metric (and to what degree). So, for example, while Bob may theoretically derive a great deal of revenue if he could sell a $100 product for $1400, the likelihood of him being able to do so successfully may be much smaller than if he were to change some other aspect of his business, such as spending more time recruiting female customers or attempting to sell upgrades to existing customers. Additionally, given that Bob has a limited number of resources (such as his time), he should focus on improving in those areas in which he will most likely reap the highest benefit (also referred to herein as taking "improvement actions"), not necessarily in those areas in which he could improve the most.

One way that performance system 104 conveys information, such as that determined by performance optimization engine 106 and/or report engine 108, is through document 110. As described herein, document 110 can take a variety of forms and may be distributed within an organization in a plurality of formats. For example, document 110 may be a dashboard into which the determined information is inserted, a component of a portal, a standalone web page, or some other interactive electronic display. Document 110 can also be a printed report or other hardcopy, an emailed file such as a PDF or a Microsoft Word document, etc.

In some embodiments, the infrastructure provided by portions of performance system 104 is located on and/or replicated across a plurality of servers rather than the entirety of performance system 104 being collocated on a single platform. Such may be the case, for example, if the contents of database 112 are vast and/or there are many processors and/or memory modules included in performance system 104.

Figure 2A:
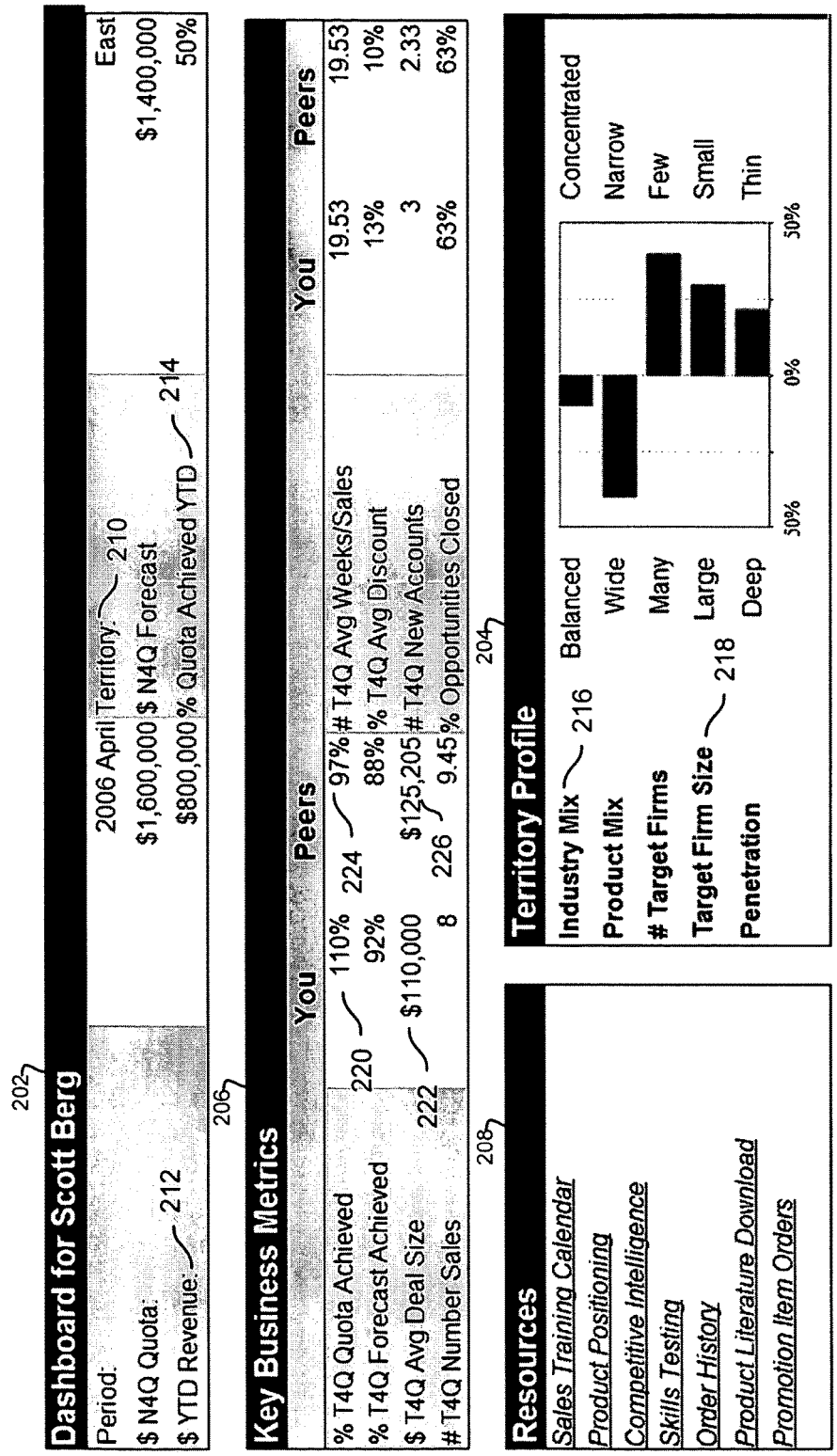
FIG. 2A illustrates an embodiment of an interface to a performance system.

FIG. 2A illustrates an embodiment of an interface to a performance system. The example shown is an implementation of document 110 as a dashboard. A salesman of networking hardware, "Scott Berg," is viewing document 110. In some embodiments, all of document 110 is presented to a user (though it may be partitioned into multiple pages). In other cases, only a subset of document 110 may be made available, such as an executive summary. Interface 200 includes a variety of information that may be of interest to Scott. In region 202, large-picture information such as the territory in which Scott operates (210), his year-to-date revenue (212), and the percentage of his quota that he has achieved so far this year (214) is shown.

In region 204, a profile of Scott's business—such as whether the industries to which he sells are more concentrated or balanced (216) and the size of his target firms (218) is shown. The profile shown is an objective assessment of territory characteristics, independent of Scott's ability.

As described in more detail below, Scott has peers—other salespeople most like him. In the example shown, Scott's peers are defined as being the 100 salespeople (or some other number) with profiles (204) quantitatively most like Scott's, and are determined in some embodiments by performing a fuzzy match with Scott's profile. As described in more detail below, what defines "most like" can be customized such that particular factors can be weighted differently. In some cases, the resulting 100 peers may all be very similar to Scott. In other cases only a subset may be particularly similar, but nonetheless the 100 most similar salespeople are designated his peers.

Peers may also be defined in other ways, such as by having a strict rule that peers have certain qualities, even if it means that the total number of peers an individual has is less than 100 (or whatever the specified number of peers is). As described in more detail below, of Scott's peers, a subset of them—the ones with the best performance—are designated top peers. So, for example, if Scott has 100 peers, 10 or 20 of those peers may be designated top peers of Scott based on the revenue they generate (or other factors, as applicable). In some embodiments, top peers are an aggregate of the top performers in each of variety of areas, rather than being a group of specific individuals.

One reason for defining peers is that the averages typically used by business intelligence tools can be misleading and do not address relative trade-offs. Suppose, for example, that Jane is especially good at deriving revenue from new customers (and bad at deriving revenue from existing customers), while John is especially good at deriving revenue from existing customers (and bad at deriving revenue from new customers). In both cases, Jane and John have specialized their sales strategies according to their strengths while choosing to not waste time pursuing activities for which they are not a good match. When compared against the average of the two salespeople, it would appear that they both need to spend equal amounts of time on new and existing customers (that they should strive to be more like each other). However, if Jane and John were to attempt to be more average, they would both become worse performers than if they focused their energy on further leveraging their respective strengths.

In region 206, key business metrics for Scott are displayed, such as the percentage of quota he has achieved in the last four quarters (220) and his average deal size over the last four quarters (222). Also displayed in region 206 are the values of his peers for those metrics. As shown, Scott has achieved significantly more of his quota than his peers (224), yet they are able to achieve larger average deal sizes (226). One reason that Scott's results are depicted against his peers rather than against a company average or the top performers companywide is that Scott's practice profile may be very different from such of non-peers. For example, suppose one employee (one of the leading salesmen at the company) sells financial services to people living in New York City. A salesman in Oklahoma—even if he has the same skills and experience as the one in New York City—will likely have a very different profile. It is accordingly potentially meaningless to compare the results of the two salesmen because their profiles are so different.

Interface 200 also includes a navigation area 208 that provides access to a variety of resources. In some embodiments, Scott (or an administrator) can configure which portions of document 110 are presented to him through interface 200, as well as the order of the regions and how much information to include in each region. For example, Scott could specify that he wants to see 10 business metrics in region 206 instead of 8, but not see his territory profile (204) at all.

Figure 2B:
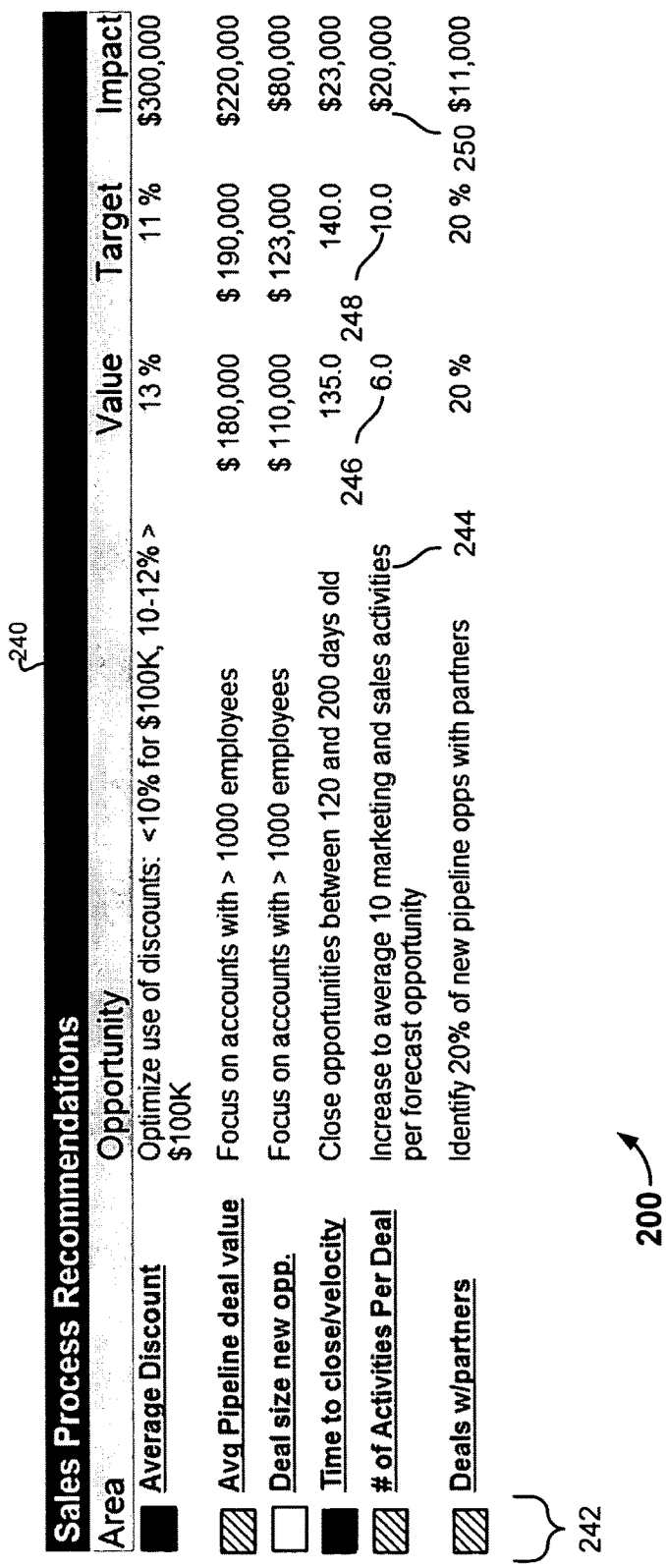
FIG. 2B illustrates an embodiment of an interface to a performance system.

FIG. 2B illustrates an embodiment of an interface to a performance system. The example shown is a portion 240 of interface 200 which includes personalized recommendations to Scott on how he can improve his sales process. In the example shown, the opportunities are ranked according to the impact they will have on his business (in this case, the impact on his revenue) if taken. Each recommendation is color coded in region 242 according to which aspect of the sales process the recommendation pertains. In the example shown, black corresponds to closing, slashes correspond to selling, and white indicates prospects.

A variety of information is presented to Scott for each recommendation. For example, recommendation 244 tells Scott that he should conduct an average of ten marketing and sales activities per forecast opportunity. He is currently engaging in six such activities as indicated at 246. The target—ten activities—is shown at 248. The estimated impact to Scott's revenue of taking the suggested recommendation is $20,000 (250). By clicking on the hyperlinks shown, such as underneath "Average Discount" and "Deal size new opp.," Scott will be taken to reports (such as those generated by report engine 108) detailing what actions should be taken with respect to which clients or types of clients (or products, services, etc.).

Figure 2C:
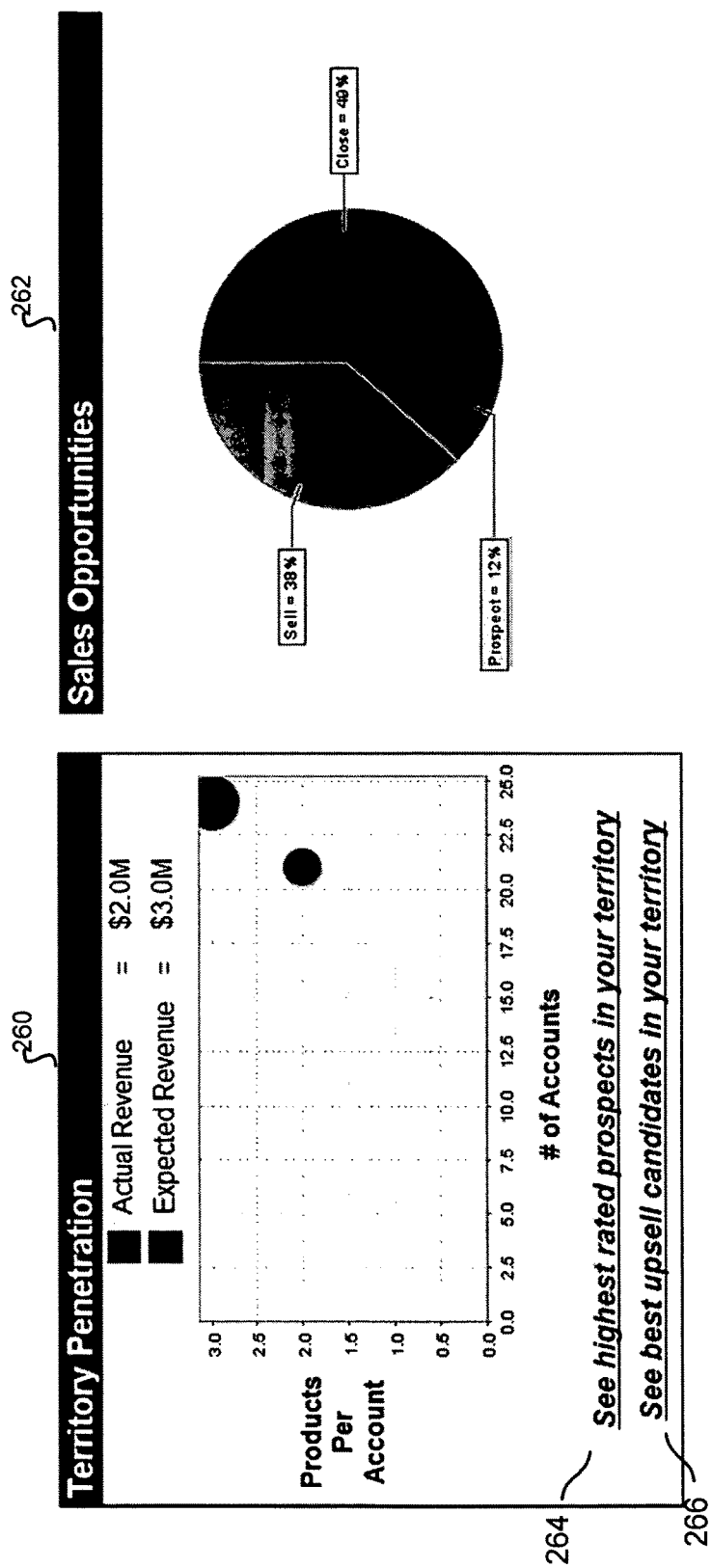
FIG. 2C illustrates an embodiment of an interface to a performance system.

FIG. 2C illustrates an embodiment of an interface to a performance system. The example shown includes portion 260 which shows his territory penetration. This region provides a multidimensional analysis of Scott's performance in his territory compared to his potential. In the example shown, the prediction is based on the territories of his peers and their performance. Scott currently has $2 M of actual revenue. However, he ought to be able to generate $3 M of revenue. By selecting region 264 of interface 200, Scott will be shown the highest rated prospects in his territory (in some embodiments determined by report engine 108). By selecting region 266 of interface 200, Scott will be shown the best upsell candidates in his territory.

Portion 262 of interface 200 indicates to Scott a personalized view of how he should focus his energies with respect to sales opportunities, helping him see which subset of the sales process he should focus on—where the marginal return is highest. He should spend 12% of his efforts on prospects, 38% of his efforts on selling, and 49% of his efforts on closing.

FIG. 3A illustrates an embodiment of an interface to a performance system. The example shown is an implementation of document 110 in a financial services industry context. Joe Smith is a broker. As with the dashboard depicted in FIGS. 2A-2C, Joe Smith is presented with large-picture information (302), a profile (304), and other information about his practice. However, the information presented is appropriately tailored to the financial services industry rather than the technology sales industry as shown before. For example, in region 302, rather than information such as that related to quotas (as shown at 214 in FIG. 2A), Joe is shown information related to account production for the trailing twelve months (306). Similarly, in region 304, Joe's profile is broken down into aspects such as whether his household focus is broad or narrow (308) and whether he obtains money more from commission or from fees (310).

Region 312 indicates that Joe should spend 49% of his efforts on developing clients, 20% of his efforts on retaining clients, and so on. A variety of other information could also be presented to Joe in this region. For example, suppose Joe is interested in account development. One graph he may elect to see would rank all of his customers by the aggregate opportunity to get more business from them and in which areas.

Region 314 shows the quarterly production levels of Joe and his peers. Region 314 also shows the quarterly production levels of Joe's top peers—those salespeople having profiles most like Joe's but also having the best performance. From this display Joe can see that while he is doing better than many of his peers, there is room for improvement—some of his peers are making considerably more revenue than he is, despite having similar profiles.

In region 316, key business metrics for Joe are displayed, such as the average number of accounts per household his clients have (318). In the example shown, Joe's clients have an average of 2.16 accounts per household. Joe's peers have an average of 2.13 accounts per household. The UGBDF column indicates the values that a broker having the ideal profile balance (Uniform, Generalist, Broad, Develop, Fees) according to the firm for which Joe works would have. Thus, in addition to showing Joe what the practices of his peers look like, the example shown displays to Joe what the result of having the ideal profile would look like so that he can determine whether to make a larger change in his business.

Interface 300 also includes a navigation area 320 that provides access to a variety of resources. In the example shown, by selecting "Generate Household Lists," Joe is taken to a page that lets him create a variety of lists using a series of pick lists and prompts. By selecting "Lookup a Household," Joe is taken to a page that lets him obtain a variety of detailed information on a particular client. Joe can also select to view one of a variety of different opportunities. For example, by selecting Household Retention Opportunities, Joe will be shown personalized tactical recommendations on how to retain clients.

Region 322 shows a history of how many new accounts and how much in assets were generated by developing existing clients in each of the last four quarters. Region 324 shows Joe's percentile relative to his peers in each of several areas for the current quarter and last quarter.

FIG. 3B illustrates an embodiment of an interface to a performance system. The example shown includes a portion 350 that provides personalized recommendations to Joe on areas on which he should focus to improve his revenue. In the example shown, the opportunities are grouped according to which of four general types of actions a broker can take (acquisition action, retention action, service action, and development action), and then ranked according to the amount of impact taking each action is predicted to have on revenue.

For example, Joe is currently losing an average of 5 households per year (354). If he were able to reduce that to 4.5 households (356), the personalized target for him, his revenue would be improved by approximately $10,000 (358). A naïve way of evaluating Joe's lost households would be to set Joe's target at 0—to specify that Joe ought to never lose a client, however, Joe's ability to achieve such a target is probably very low. Instead, as described in more detail below, the individualized targets set for Joe are based both on the expected impact on revenue of achieving the target as well as the likelihood of Joe being able to achieve the target.

Targets can also be based (or adjusted) based on custom rules. For example, while it might be more profitable (and probable) for Joe to spend as little time as possible following up with existing customers, an organization may specify a policy of maintaining certain minimum contacts with each customer that a salesman is expected to keep (such as for reasons of goodwill). Similarly, regulations such as banking or securities laws may impose particular requirements on areas such as the amount of money Joe may spend entertaining clients or the amount of money he charges for services. In such a case, performance engine 106 can be configured to take into account such custom rules or parameters when determining goals or targets for Joe.

Region 352 shows Joe the metrics corresponding with the areas in which he excels and how he rates in those areas relative to his peers. For example, Joe is in the $97^{th}$ percentile with respect to the percentage of new households in the last year (having almost twice as much as his peers).

Figure 4:
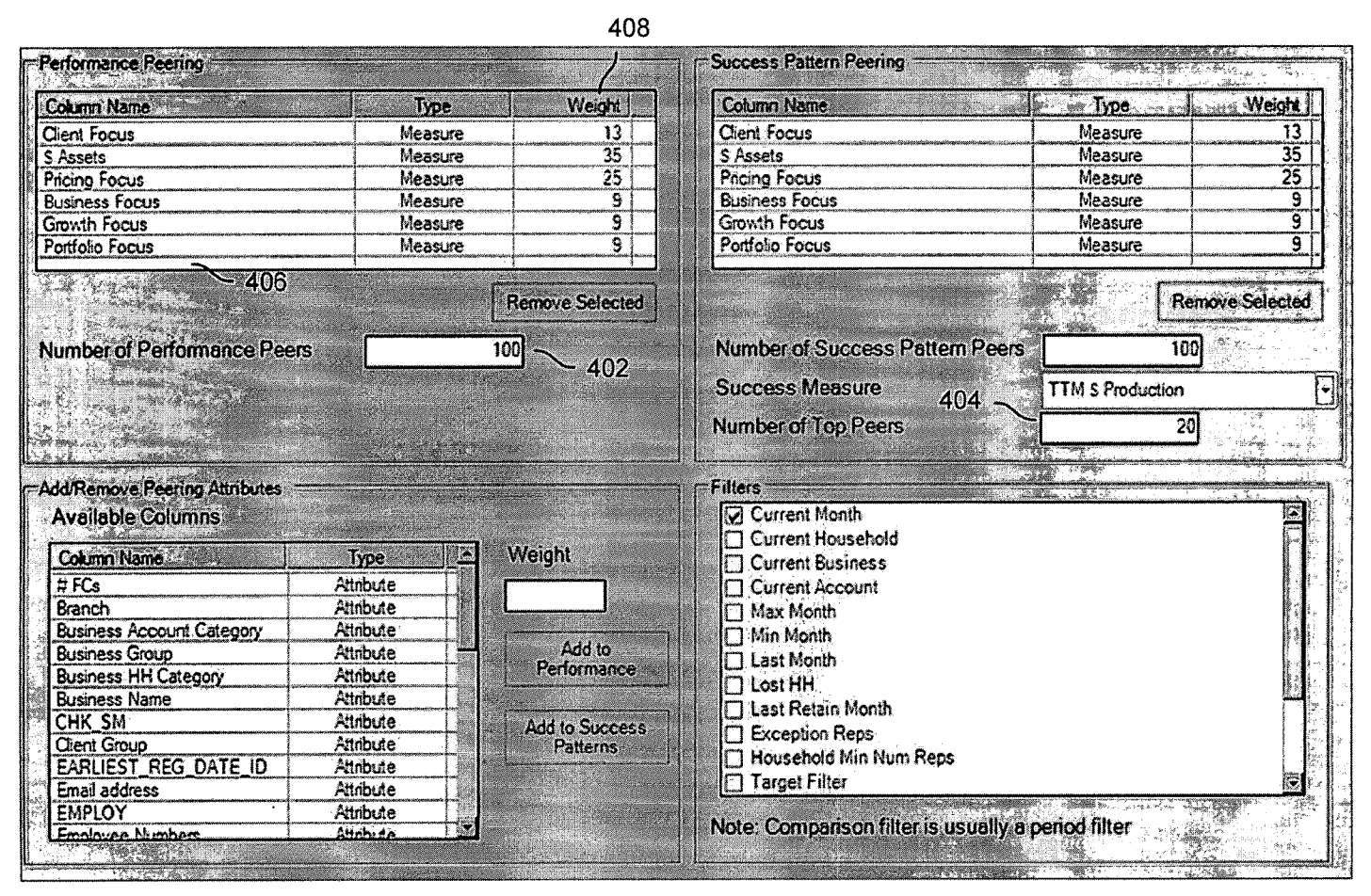

FIG. 4 illustrates an embodiment of an administrative interface to a performance system. The portion shown allows an administrator to configure parameters associated with peers such as the number of peers an individual has (402), the number of top peers (404), and what information is used to determine those peers (e.g., 406) including what weight to assign different measures (408).

Metrics

Businesses typically have a desired result that they are attempting to maximize, such as revenue or profit. Suppose the primary goal of a business is to maximize revenue. Resources can be spent on driving any number of results (which can in turn be measured by metrics). One key question is which metrics drive the greatest results. Analytically, revenue can be thought of as a function of these metrics: $ Re venue=$f_1$(metric$_1$)+$f_2$(metric$_2$)+ . . . +$f_n$(metric$_n$). To maximize revenue, in addition to measuring the values of assorted metrics, one should also determine the likely impact of metrics on one another. As described in more detail below, in addition to determining the incremental impact of a metric, to maximize revenue, the metrics that have the greatest impact on business results and the most likely values of those metrics that will produce the desired result should be determined.

Figure 5A:
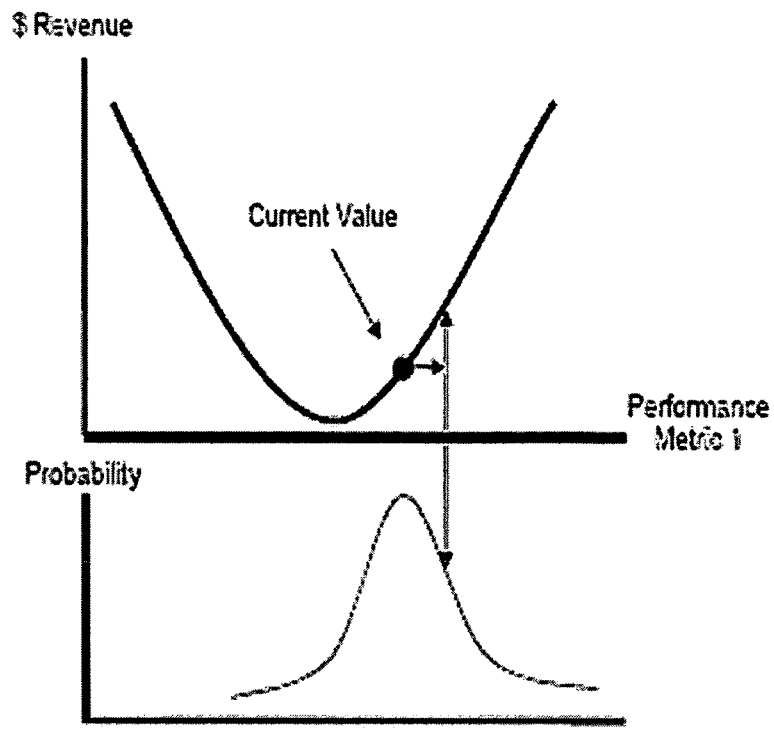
FIG. 5A is an illustration of how much impact a metric has on revenue and the likelihood that that metric has of changing.

FIG. 5A is an illustration of how much impact a metric has on revenue and the likelihood that that metric has of changing. In the example shown, two relationships are used. The first relationship is between a metric and results (in this example, revenue). One way this relationship can be determined is by looking at the entire population of individuals and measuring how results vary with a variance in a given metric. In some embodiments, results are modeled as a function of all metrics taken together. The second relationship is the likelihood that a given metric can change. One way this relationship can be determined is by looking at the historical ability of individuals to move this metric over time. A probability distribution can be estimated that indicates the likelihood that a given metric can be moved by a certain amount based on actual changes by peers.

Figure 5B:
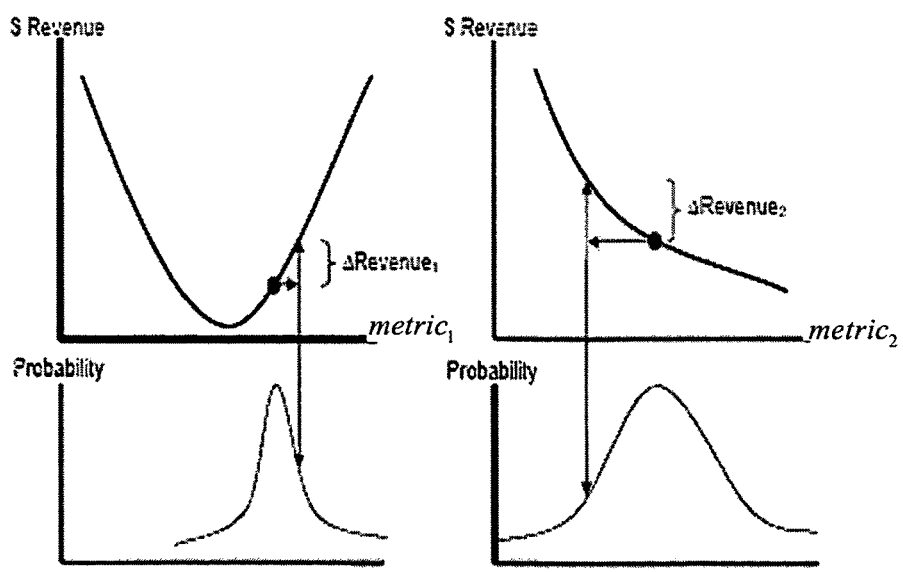
FIG. 5B is an illustration of optimizing metrics.

After determining the relationships between individual metrics and results, the best metrics and the optimal values for those metrics can be determined. FIG. 5B is an illustration of optimizing metrics. Suppose the values of two metrics are to be optimized. In the example shown, the optimum point is determined as the one where the probability is maximized and $\Delta Re\ venue_1 + \Delta Re\ venue_2$ equals the target revenue improvement (for example, a 20% gain). A good solution is the one in which the target improvement is reached and the likelihood of success is maximized.

Once it has been determined in what areas focus will drive the greatest results, an additional question to ask is how others achieved similar results. Suppose a sales representative has a large opportunity to drive results by improving her average deal size. She may be able to generate a large number of deals, but the size of those deals may be smaller than those of her peers. The question that she would like answered is, "Where/how are the best performers getting bigger deals?" The question can be restated as a desire to find the customer or product segments where there is the largest opportunity to grow deal size.

One way to answer the question is to compare her deal size with that of her top performing peers. What products customers are buying is known and a variety of customer attributes can be used to segment the customer base. For example, for each deal, the following information is known about a customer: customer size in employees; customer size in revenue; customer industry (at various levels of detail); customer geography; customer tenure (how long have they been a customer); customer purchase behavior (large customer, small customer); and customer deal sizes/transaction types. The following example information is known about products: purchases by product type; purchases by product category; purchases by product sub-category; purchases by product features.

Several additional attributes are likely also regularly captured on transactions that provide deep insight into what types of deals are occurring. For example, for any particular metric, there may many different breakouts that can provide insight into where success is occurring. Each of these breakout attributes may have one of several different values. If there are 40 metrics being measured, there may be a total of several thousand different segments that can be considered for each sales representative in searching for areas of opportunity.

Whether one is performing better or worse in a particular segment may or may not be that interesting. Success in some segments may be strongly correlated with success overall, while other segments are not as important. As described in more detail below, all possible segments can be evaluated to find those that are the most attractive.

Figure 6:
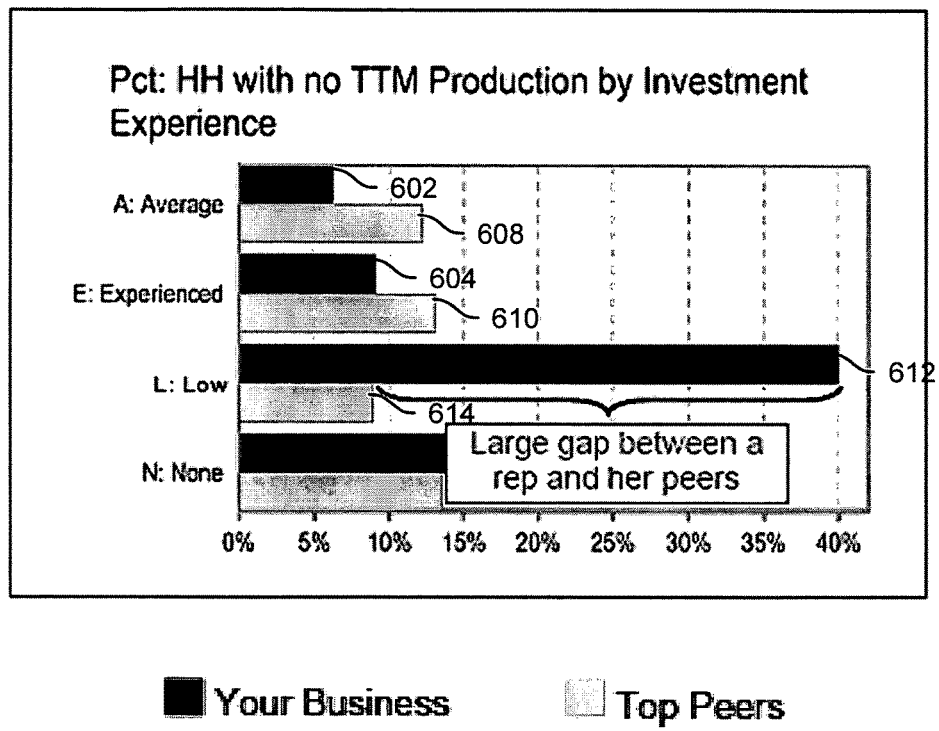
FIG. 6 illustrates an example of an embodiment of a report.

FIG. 6 illustrates an example of an embodiment of a report. The breakout shown indicates what percentage of households is not generating any revenue based on their investment experience. In this example, the fewer unproductive household a person has, the better. The representative has few unproductive households where the clients have average experience (602) or above average investment experience (604). In those two segments, she is doing better than her peers (608 and 610, respectively). However, this representative has a large number of inexperienced clients that do not generate any revenue (612)—dramatically more than her peers (614). Suppose there is a relatively strong correlation between the percentage of inexperienced clients that are non-productive and overall results. As a result, segment 612 is potentially a very significant segment for the representative to address.

As described in more detail below, important reports—those highlighting interesting gaps or areas in which attention should be focused—can be determined by evaluating both the gap between a given individual and their peers and the correlation between success in that segment and overall results. Taken together, a representative can then focus on the few segments with the greatest overall opportunity for success.

Once a set of promising segments is identified, for example, in a report such as the one shown in FIG. 6, another question to ask is, which customers/clients/products/etc. fall into that segment so that the representative can act. In the example shown, the representative might like to see a list of clients in her book of business that have low investment experience, as well as their production. She can then identify households where there is an opportunity to either create a productive relationship, or to move that client to another, lower-cost channel that better suits their level of business—thus maximizing her revenue.

Figure 7:
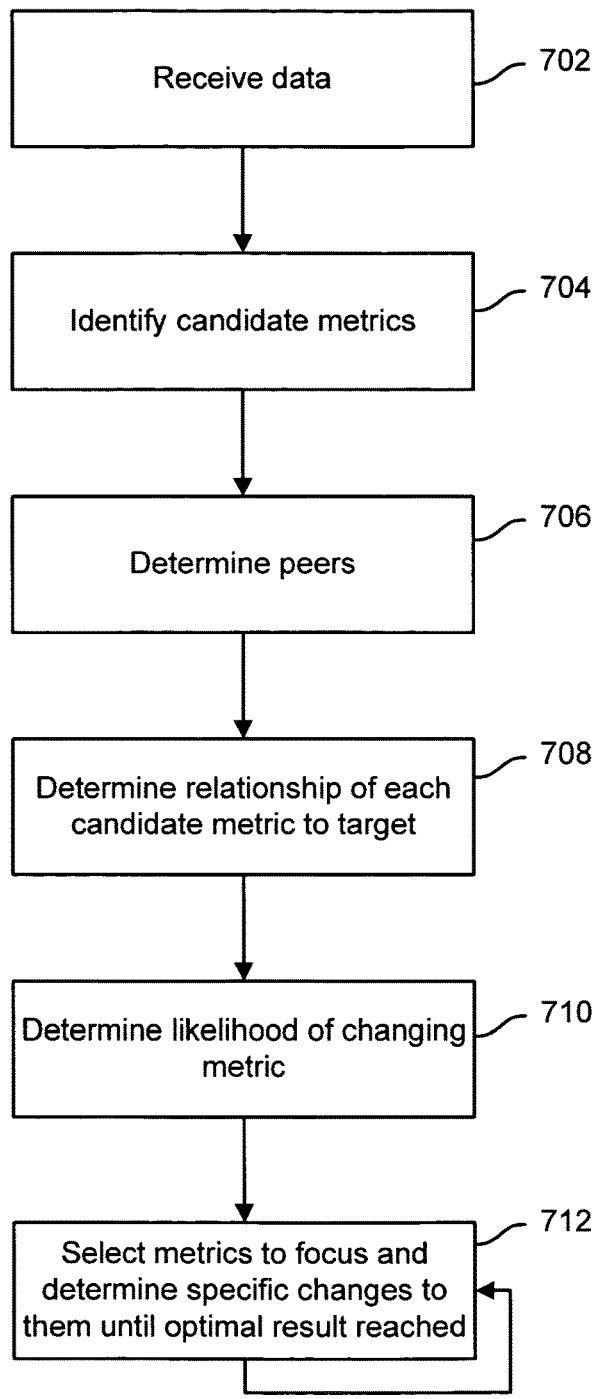
FIG. 7 is a flow chart illustrating an embodiment of a process for determining an improvement action.

FIG. 7 is a flow chart illustrating an embodiment of a process for determining an improvement action. In some embodiments the processing shown in FIG. 7 is implemented by performance engine 106. An example of an improvement action is shown at 244 in FIG. 2B ("Increase to average 10 marketing and sales activities per forecast opportunity").

The process begins at 702 when data, such as data 102 is received. At 704, candidate metrics are identified. Metrics measure the process chosen to be improved but generally do not overlap one another. In the example of a high technology or software sales context, metrics measure values such as leads converted and new opportunities. In some cases, a list of candidate metrics is provided, such as by an administrator. In other cases, metrics are selected, such as based on a template, or a particular area in which an improvement is sought. The candidate set of metrics is measured as is the impact of those candidate metrics on the outcome.

At 706, peers are determined, such as by performing a fuzzy match using an individual's profile. In some embodiments, the determination of peers is performed independently of the processing shown in FIG. 7. For example, the peers for an individual may be computed once a month and stored, e.g., in database 112. The processing performed at 706 can also be performed in conjunction with the techniques employed by report engine 108 and the results shared with performance engine 106 as applicable.

At 708, the relationship of each candidate metric to the target is determined. In some embodiments, this is accomplished by evaluating each metric by itself and then looking a the correlation with the target. As described in more detail below, models that evaluate all candidate metrics simultaneously can also be employed.

At 710, the likelihood of changing the metric is determined. In some embodiments, a probability distribution is developed by examining each of the candidate metrics. As described in more detail below, an estimate of how likely it is to make a change of a given magnitude is determined in some embodiments by evaluating historical information, such as monthly samples of data associated with peers. Based on the historical information, a distribution can be taken that helps indicate the likelihood of making a change of a given magnitude.

At 712, metrics to focus on are selected and specific changes to those metrics are evaluated. A variety of techniques can be used to accomplish this. In some embodiments, a nonlinear optimization technique is used to select specific changes to metrics. Two examples include the Simplex method and Quasi-Newton nonlinear optimization. As described in more detail below, in some embodiments, the likelihood across all metrics is determined simultaneously. Suppose there are 35 candidate metrics. A genetic optimizer can be used to try assorted combinations of subsets of those candidate metrics and the values thereof.

Depending on factors such as available computing resources and preference, the processing performed at 712 is optionally repeated until an optimal result is achieved. In some cases, such as when computing power or the amount of time available to perform the processing at 712 is limited, a good, but not necessarily best result may be all that is required. The term "optimal" solution as used herein encompasses both types of solutions—the very best solution, as well as more rough but reasonable approximations of good solutions.

Figure 8A:
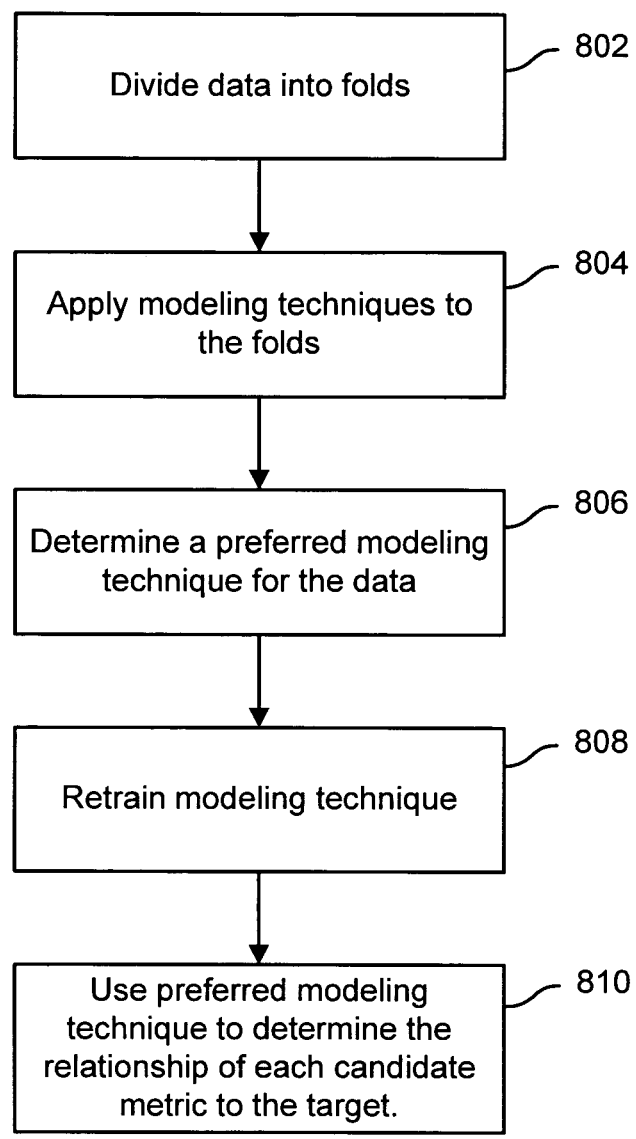
FIG. 8A is a flow chart illustrating an embodiment of a process for determining the relationship of a candidate metric to a target.

FIG. 8A is a flow chart illustrating an embodiment of a process for determining the relationship of a candidate metric to a target. In some embodiments the processing shown in FIG. 8A is performed at 708 of FIG. 7.

At 802, the data is divided into folds. In some embodiments, only a subset of the data is initially used, for example to improve the speed of the processing. At 804, one or more modeling techniques are applied to the folds.

At 806, a preferred modeling technique for the data is determined. Suppose data is divided into five folds at 802. Assorted algorithms (linear regression, nonlinear regression, neural networks, support vector machines, decision trees, rule induction, or any other appropriate technique) operate on the folds and are subjected to cross-validation—in this example training on any four of the folds and testing on the remaining one. In this example, a preferred modeling technique is the one that best fits the data based on the cross-validation analysis.

At 808, the preferred modeling technique is trained on all of the available data and at 810 the preferred modeling technique is used to determine the relationship of each candidate metric to the target. In some embodiments, a single technique is used and portions 802-806 are omitted, or adapted using the same technique but different parameters, as applicable.

Figure 8B:
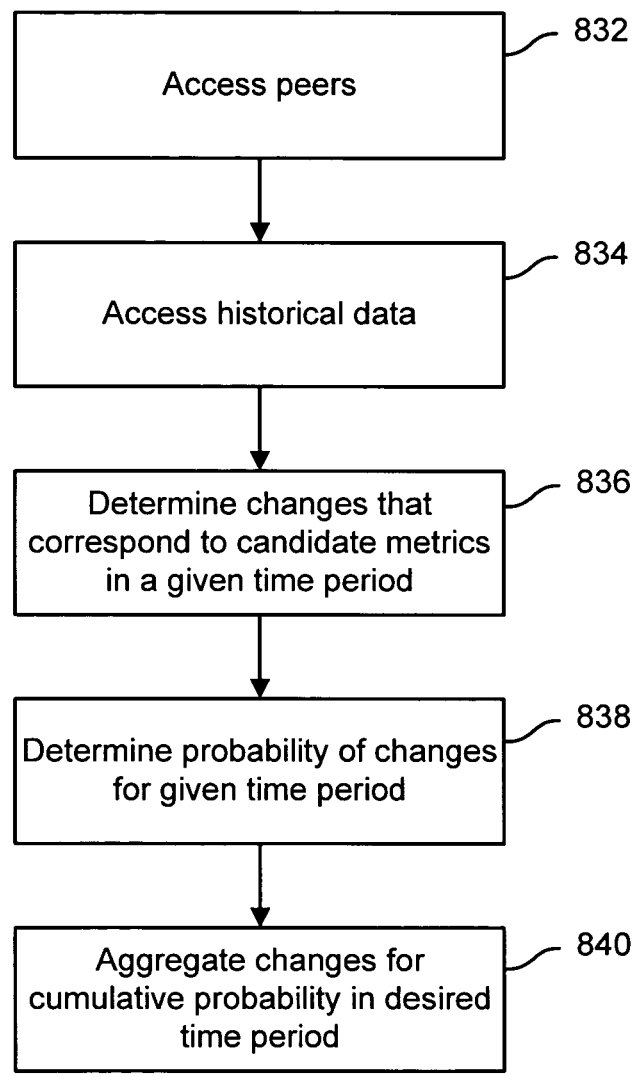
FIG. 8B is a flow chart illustrating an embodiment of a process for determining the likelihood of changing a metric.

FIG. 8B is a flow chart illustrating an embodiment of a process for determining the likelihood of changing a metric. In some embodiments the processing shown in FIG. 8B is performed at 710 at FIG. 7. The process begins at 832 when peer information is accessed, such by receiving the information determined at 706 in FIG. 7. At 834, historical data associated with those peers is also accessed. Suppose database 112 includes twelve months of data across the peers accessed at 832. Represented in that data are 11 months of changes. If there are 100 peers, in this example there are 1100 sample points that indicate how much a person can change a metric month to month.

At 836 the occurrence of changes that correspond to candidate metrics in a given time period is determined. The received information can be used to develop a probability distribution. In this example, the mean and standard deviation are computed and the distribution is approximated to be normal.

At 838, the probability of changes for a given time period is determined. For any given change there is a probability of the change occurring and a degree of magnitude that can be measured. In some embodiments, probabilities are evaluated for each metric one at a time. A multidimensional normal distribution can be approximated, as applicable, by taking the product of several one-dimensional normals.

At 840, detected changes are aggregated and evaluated for the cumulative probability in the goal time period.

Figure 8C:
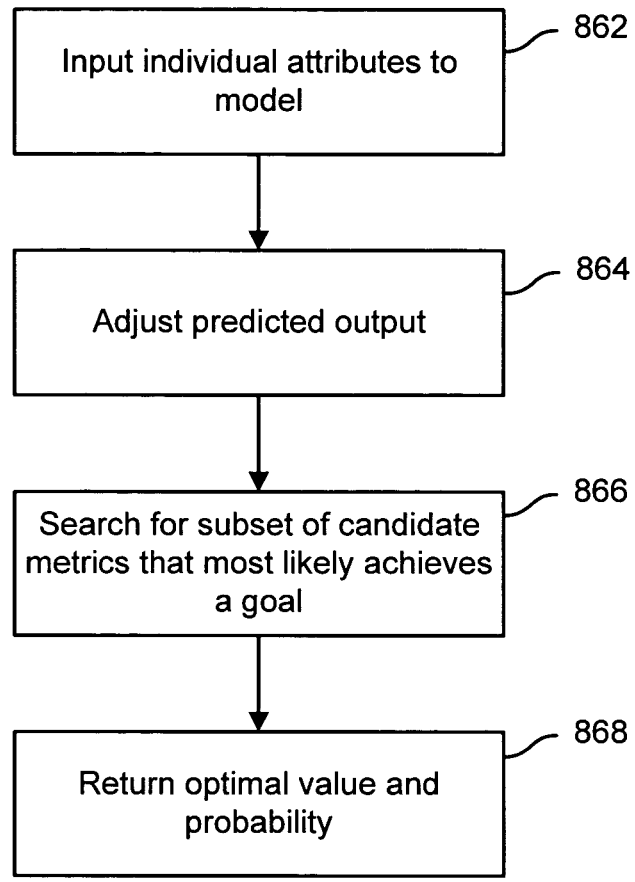
FIG. 8C is a flow chart illustrating an embodiment of a process for determining an optimal result.

FIG. 8C is a flow chart illustrating an embodiment of a process for determining an optimal result. In some embodiments the processing shown in FIG. 8C is performed at 712 at FIG. 7. The process begins at 862 when individual attributes to model are received. For example, at 862 the data associated with an individual is received and an estimate of what their production should be is estimated such as based on a model that relates assorted dependent variables and the independent one variable, production.

At 864 the predicted output is adjusted as appropriate to fit the model, adding an error as necessary. At 866, the candidate metrics that most likely achieve the goal are searched for. In this example the statistical optimization technique employed is genetic optimization. In other cases other techniques may be used and the processing performed at 866 is adapted as appropriate to the technique.

A population of candidate solutions is created. The population is alternately mutated, evaluated for fitness, and terminated. Suppose there are 100 candidates in the population. In this example, 100 subsets of 6 candidates are created, each having a way of reaching a target (e.g., 20% revenue growth) with a highest probability. As the least likely solutions are terminated and the mutated solutions that are the most likely are added, eventually a good solution evolves. In some embodiments, a candidate set of changes is determined as follows: Once a set of metrics is chosen, a nonlinear optimizer selects the values that reach the target improvement and the probability of those changes happening is calculated. One potential solution can then be compared with the other ones in the global/genetic optimization).

At 868 the optimal solution is optionally outputted. In some cases, the optimal solution is displayed directly to a user, such as through document 110. In other cases, the output of the processing shown in FIG. 7 and FIGS. 8A-8C is conveyed from one portion of preference system 104 to another, such as by being the output of performance engine 106 and the input of report engine 108.

Figure 9:
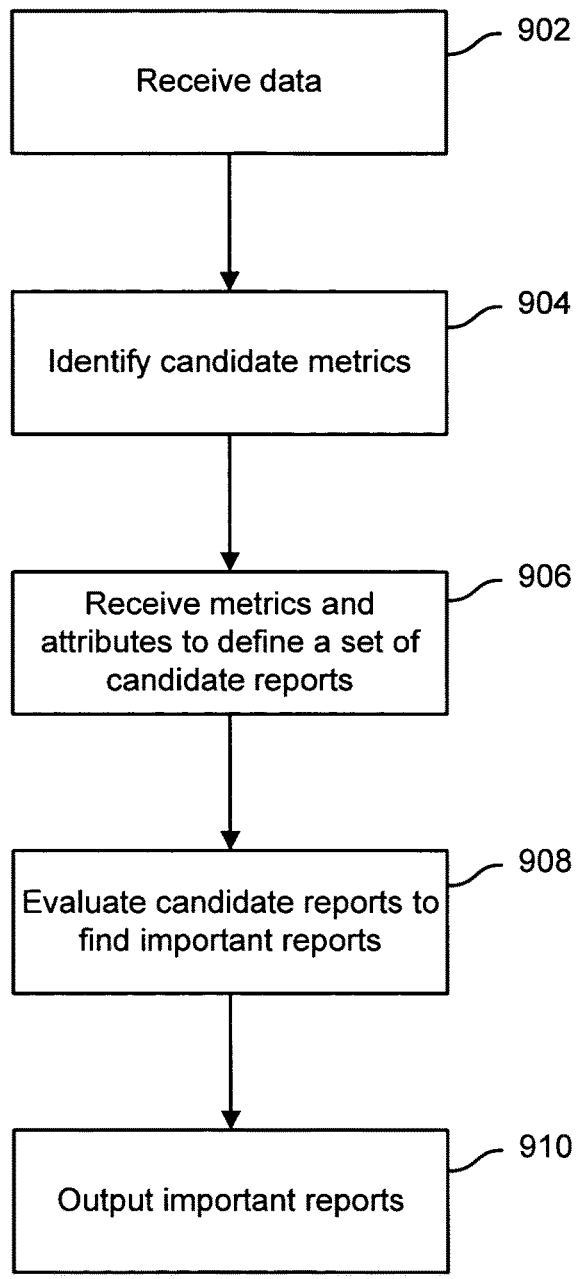
FIG. 9 illustrates an embodiment of a process for selecting a report.

FIG. 9 illustrates an embodiment of a process for selecting a report. In some embodiments the processing shown in FIG. 9 is implemented by report engine 108. The process begins when data is received (902) and candidate metrics are identified (904). In some embodiments, the processing performed at 902 and/or 904 is omitted (for example if it was previously performed at 702 and 704 of FIG. 7. However, the candidate metrics received at 904 need not be the same as those received at 704 in FIG. 7.

At 906 metrics and attributes to define a set of candidate reports are received. Suppose 30 metrics are received at 904. Each of those metrics can be broken out into a set of attributes. For example, new households may be by broken out by account source or account type. If there are several metrics, each having several attributes and dimensions, potentially hundreds of reports can be viewed. All or a subset of the possible reports can be designated candidate reports.

At 908 the candidate reports are evaluated to find important reports. As described previously, one factor that can be used to determine importance is the gap between an individual's performance and the comparable performance of his peers in an area which correlates with revenue. At 910, any reports determined to be important at 908 are outputted, such as in document 110.

Figure 10:
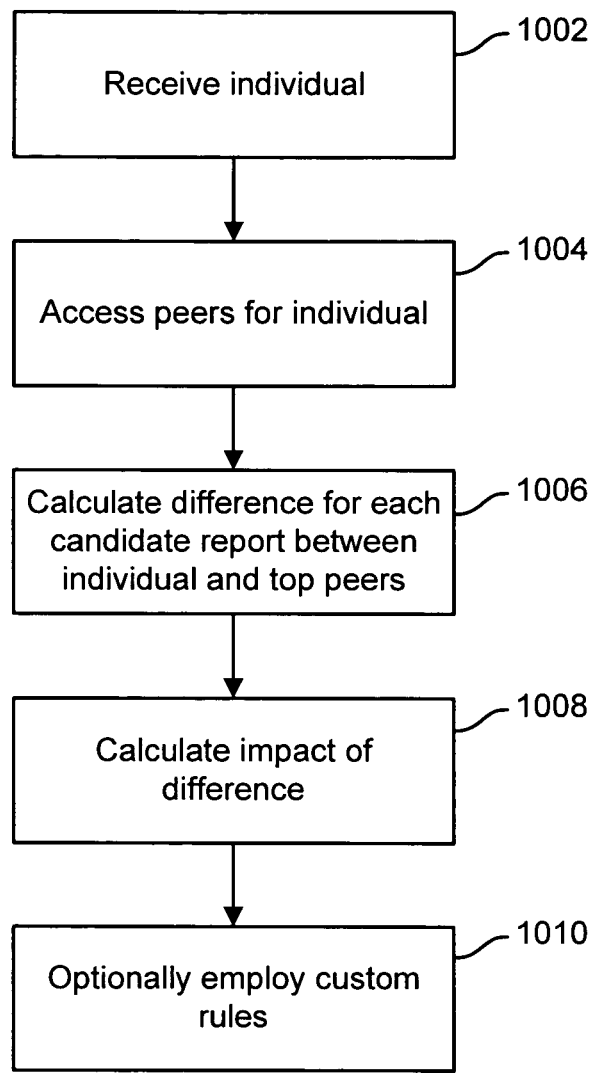
FIG. 10 illustrates an embodiment of a process for evaluating candidate reports.

FIG. 10 illustrates an embodiment of a process for evaluating candidate reports. In some embodiments the processing shown in FIG. 10 is used at 908 in FIG. 9. At 1002 an individual is received. At 1004, peers for the individual received at 1002 are received. In some embodiments rather than operating on the information of an individual and his peers, other populations (such as East Coast vs. West Coast or all "good" employees vs. all "bad" employees) are used and the techniques described herein adapted as appropriate (e.g., comparing a first population against a second population).

At 1006 a difference for each candidate report is determined between the individual and the individual's corresponding top peers. For example, at 1006 the gaps previously described are detected. At 1008, the impact of the calculated differences is determined, such as by simple correlation. Typically, instances in which the individual performs significantly better than his peers (rather than significantly worse than his peers) are ignored—the sign of the difference is considered—because individuals generally are looking for ways to improve their performance. However, as appropriate the sign can be ignored and/or instances where peers perform significantly worse may be designated of interest. Such may be the case, for example, if the report is to be used by a manager to evaluate the performance of groups of individuals. In some embodiments, multivariate correlation or other mechanisms are used to determine the impact.

At 1010, custom rules are optionally employed to weight results. For example, while a particular gap may exist between an individual and his peers, and while the gap may have a significant impact on revenue, it may be the case (e.g., due to government regulations or other requirements) that the individual is incapable of or unauthorized to improve in that area. In such case, rules can be applied to prevent a report associated with that gap from being designated as interesting (and/or omit it from being shown, or change its position among reports shown).

Custom rules may also be applied in other ways, such as by influencing the values ascribed to gaps. For example, a large gap may be detected between an individual who sells only retirement products and peers who have a more mixed practice. If the individual has built a name for himself in the area of retirement planning, indicating that he could improve revenue by selling other products as well is potentially uninteresting and can be weighted down (or negated as being actionable accordingly).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
obtaining a plurality of candidate reports, wherein different candidate reports in the plurality of candidate reports are defined using different sets of metrics and attributes, wherein a metric comprises a measured quantity, and wherein an attribute comprises a breakout attribute by which the metric can be partitioned;
receiving an indication of a first population including a first set of one or more individuals and a second population including a second set of one or more individuals;
determining, using a processor, an importance, relative to the first population, of each candidate report in the plurality of candidate reports at least in part by evaluating each candidate report in the plurality of candidate reports, wherein evaluating a given candidate report includes:
determining, for the given candidate report, a difference in performance between the first population and the second population, wherein the difference is determined with respect to a set of metrics and attributes used to define the given candidate report;
determining an impact on a result of the difference in performance between the first population and the second population determined for the given candidate report, wherein the impact on the result factors a probability of a likelihood of change of each respectively selected metric and attribute; and
weighting the impact of the result at least in part by applying one or more custom rules directed to factoring an ability of the first population to change each respectively selected metric and attribute, the ability involving issues within the control of, and issues out of the control of, the first population; and
based at least in part on the determining of importance, relative to the first population, of each candidate report in the plurality of candidate reports:
displaying, in a user interface, a first subset of reports in the plurality of candidate reports determined to be of importance to the first population;
filtering down, in the user interface, and separately locating or marking a second subset of reports in the plurality of candidate reports determined to be of less importance to the first population; and
separately displaying, in the user interface, metrics or attributes responsible for the difference in performance between the first population and the second population, and the determined impact on the result of the difference.

2. The method of claim 1 wherein the first population is an individual.

3. The method of claim 1 wherein the second population is one or more peers of an individual.

4. The method of claim 1 wherein the second population is one or more top peers of an individual.

5. The method of claim 1 wherein evaluating the given candidate report includes applying at least one statistical algorithm.

6. The method of claim 1 wherein evaluating the given candidate report includes determining the impact of the determined difference on revenue.

7. The method of claim 1 wherein evaluating the given candidate report includes determining which of the first and second populations has the most significant impact on revenue.

8. A system, including:
at least one processor including at least an optimization engine, a peering engine and a report engine;
an interactive user interface; and
a memory coupled with the at least one processor, wherein the memory is configured to provide the at least one processor with instructions which when executed cause the at least one processor to:
obtain, via the report engine, a plurality of candidate reports, wherein different candidate reports in the plurality of candidate reports are defined using different sets of metrics and attributes, wherein a metric comprises a measured quantity, and wherein an attribute comprises a breakout attribute by which the metric can be partitioned;
receive, via the peering engine, an indication of a first population including a first set of one or more individuals and a second population including a second set of one or more individuals;
determine, via the optimization engine, an importance, relative to the first population, of each candidate report in the plurality of candidate reports at least in part by evaluating each candidate report in the plurality of candidate reports, wherein evaluating a given candidate report includes:

determining, for the given candidate report, a difference in performance between the first population and the second population, wherein the difference is determined with respect to a set of metrics and attributes used to define the given candidate report;

determining an impact on a result of the difference in performance between the first population and the second population determined for the given candidate report wherein the impact on the result factors a probability of a likelihood of change of each respectively selected metric and attribute; and weighting the impact of the result at least in part by applying one or more custom rules directed to factoring an ability of the first population to change each respectively selected metric and attribute, the ability involving issues within the control of, and issues out of the control of, the first population; and based at least in part on the determining of importance, relative to the first population, of each candidate report in the plurality of candidate reports:

display, in the interactive user interface, a first subset of reports in the plurality of candidate reports determined to be of importance to the first population; and filter down, in the interactive user interface, and separately locating or marking a second subset of reports in the plurality of candidate reports determined to be of less importance to the first population; and separately display, in the user interface, metrics or attributes responsible for the difference in performance between the first population and the second population, and the determined impact on the result of the difference.

9. The system of claim 8 wherein the first population is an individual.

10. The system of claim 8 wherein the second population is one or more peers of an individual.

11. The system of claim 8 wherein the second population is one or more top peers of an individual.

12. The system of claim 8 wherein evaluating the given candidate report includes applying at least one statistical algorithm.

13. The system of claim 8 wherein evaluating the given candidate report includes determining the impact of the determined difference on revenue.

14. The system of claim 8 wherein evaluating the given candidate report includes determining which of the first and second populations has the most significant impact on revenue.

15. A computer program product embodied in a non-transitory computer readable storage medium and comprising computer instructions for:

obtaining a plurality of candidate reports, wherein different candidate reports in the plurality of candidate reports are defined using different sets of metrics and attributes, wherein a metric comprises a measured quantity, and wherein an attribute comprises a breakout attribute by which the metric can be partitioned;

receiving an indication of a first population including a first set of one or more individuals and a second population including a second set of one or more individuals;

determining, using a processor, an importance, relative to the first population, of each candidate report in the plurality of candidate reports at least in part by evaluating each candidate report in the plurality of candidate reports, wherein evaluating a given candidate report includes:

determining, for the given candidate report, a difference in performance between the first population and the second population, wherein the difference is determined with respect to a set of metrics and attributes used to define the given candidate report;

determining an impact on a result of the difference in performance between the first population and the second population determined for the given candidate report, wherein the impact on the result factors a probability of a likelihood of change of each respectively selected metric and attribute; and weighting the impact of the result at least in part by applying one or more custom rules directed to factoring an ability of the first population to change each respectively selected metric and attribute, the ability involving issues within the control of, and issues out of the control of, the first population; and based at least in part on the determining of importance, relative to the first population, of each candidate report in the plurality of candidate reports:

displaying, in a user interface, a first subset of reports in the plurality of candidate reports determined to be of importance to the first population; and filtering down, in the user interface, and separately locating or marking a second subset of reports in the plurality of candidate reports determined to be of less importance to the first population; and separately displaying, in the user interface, metrics or attributes responsible for the difference in performance between the first population and the second population, and the determined impact on the result of the difference.

16. The method of claim 1 wherein the second subset of reports in the plurality of candidate reports determined to be of less importance are not presented in the user interface or are given less prominence.

* * * * *